W. C. BUSSEY.
Ditching and Fencing Machine.
No. 4,740. Patented Sept. 3, 1846.
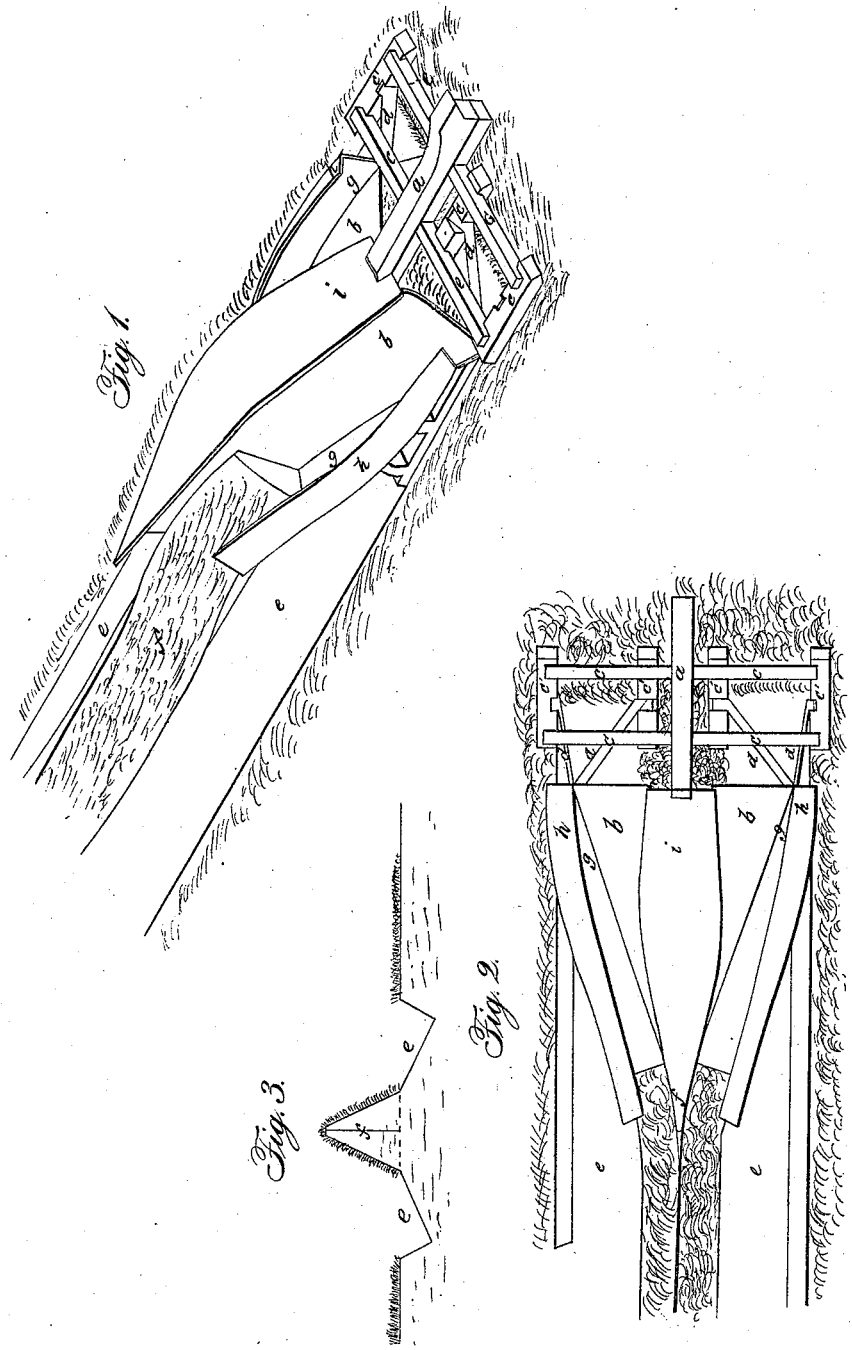

UNITED STATES PATENT OFFICE.

W. C. BUSSEY, OF ROCK GROVE, ILLINOIS.

IMPROVEMENT IN MACHINES FOR DITCHING AND EMBANKING.

Specification forming part of Letters Patent No. 4,740, dated September 3, 1846.

*To all whom it may concern:*

Be it known that I, WILLIAM C. BUSSEY, of Rock Grove, in the county of Stephenson and State of Illinois, have invented a new and Improved Machine for Fencing and Ditching at one and the same operation; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is an isometrical view of the machine; Fig. 2, a top plan, and Fig. 3 a section across the fence and ditches.

The same letters indicate like parts in all the figures.

It has heretofore been found difficult to form a fence of earth that would stand without a complicated and expensive process of throwing up the dirt from trenches on each side and then sodding it over, the mound being formed by spading or plowing, or both. The process of sodding, being slow and expensive, has rendered this kind of fence objectionable, and often prevented its coming into use. By my machine two ditches are cut parallel to each other and a mound or ridge of earth raised between them, all perfectly sodded and more compact than the old method.

The construction of my machine is as follows:

On each side of a center beam, *a*, there is a mold-board or twisted plane, *b*, so formed as to receive the sod and earth from the ditch from which it is cut, and thence gradually raising it up till the under and inner side is perpendicular, at which point both mold-boards join and terminate. Therefore as the sod leaves the mold-board that on each side meets the other, and is thus supported. Just beyond the front edge of the mold-board there is an oblong frame, *c*, attached across the beam *a*, having four runners, *c'*, attached to it parallel with the beam, on which it bears. From this frame two knives, *d*, incline downward and back to the lower corner of the mold-board, where they join these knives, cut out the sod, and form the ditch, as shown at *ee*, Fig. 3, the fence that is elevated between them being designated by the letter *f*.

Along the lower edge of the mold-board there is a rim or sole, *g*, attached nearly at right angles thereto, on which the edge of the sod rides as it is lifted; and, again, the upper edge of this sole has a ledge, *h*, on it, which serves to keep the sod in place and gradually direct the lower edge inward as it rises to a perpendicular position. The front edge of this last-named piece is armed with a cutter to cut off any projections on the surface of the sod. The cap *i* between the mold-boards projects a little over them, as clearly shown in the drawings.

A suitable frame-work is added to the above-described parts to strengthen it, which may be varied with the size of the machine and the soil it is to be used in. When put into operation it is drawn along by a capstan connected with the front end of the beam *a*, and moved by any suitable power. The sod is cut by the knives *d*, and then elevated by the mold-board onto the space between the ditches, when it is deposited in an upright position and left, as at *f*, with the grass out, and forming a perfect sod bank or ridge.

Having thus fully described my machine and its mode of operation, what I claim therein as new, and desire to secure by Letters Patent, is—

The combination of two ditching-machines in the manner described, so that the sods cut from two parallel ditches shall be elevated and placed with the grass out in a continuous ridge between said ditches at one operation, in the manner and for the purpose set forth.

WILLIAM C. BUSSEY.

Witnesses:
A. P. BROWNE,
WILLIAM DYSERT.